A. MONNIER.
Making Spelter.
No. 17,336. Patented May 19, 1857.
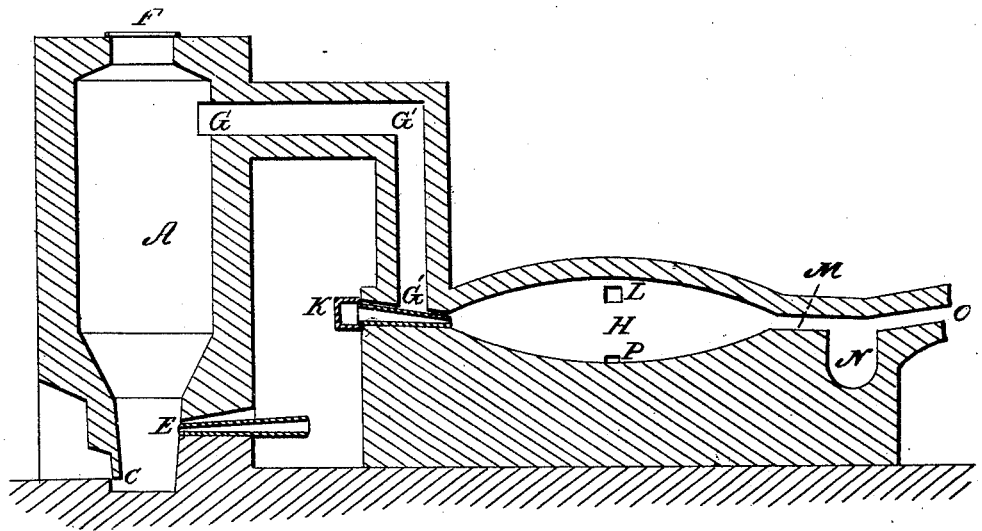
Witnesses.
J. H. B. Jenkins
Geo. Harding.
Inventor.
Alfred Amonnier

UNITED STATES PATENT OFFICE.

ALFRED MONNIER, OF CAMDEN, NEW JERSEY.

IMPROVED APPARATUS FOR REDUCING ZINC ORES.

Specification forming part of Letters Patent No. 17,336, dated May 19, 1857.

*To all whom it may concern:*

Be it known that I, ALFRED MONNIER, of the city of Camden and State of New Jersey, have invented a new and useful Improvement in Apparatus for the Manufacture of Metallic Zinc from the Ore; and I do hereby declare the following to be a full and exact description thereof, reference being had to the accompanying drawing.

Heretofore metallic zinc has been obtained by heating a mixture of the ore of zinc and coal together in a muffle or retort and applying heat thereto, thus reducing the oxide of zinc and driving off the metal in the form of vapor, which was condensed into the liquid or solid state in a receptacle communicating with the muffle. By this process there is a gangue or mass of silica, alumina, silicate of zinc, and other earthy matter which remains in the retort or muffle during the whole process unacted upon. This gangue bears a large proportion to the whole mass of ore—viz., sixty to sixty-five per cent. thereof. It is required to be heated to a very high degree in order to cause the deoxidation or reduction of the oxide of zinc diffused through the large mass. This intense heat destroys the apparatus employed, and the process is retarded by the presence during the whole time of so large a mass of gangue. Moreover, all or nearly all of the silicate of zinc which is in the ore remains unreduced and mixed up with the rest of the gangue, and is thrown off as refuse. A very large amount of fuel is required to elevate the mass to the proper degree of heat. By my improved apparatus, instead of reducing the ore directly to metallic zinc, I flux the ore in the first instance and convert it into white oxide of zinc and slag, and at the moment of the formation of the white oxide of zinc it is reduced into the metallic state and condensed.

I construct my improved apparatus as follows: A is an upright gas-furnace composed of a cylindrical furnace, A, with a tuyere opening into it at E, supplied with a blast of cold air. C is an opening for removing ashes.

I place in the furnace A, through the cap F, a quantity of coal and ignite it below, and keep a thick bed of coal above tuyere—say three or four feet. The air being forced through this large mass of carbon generates a large amount of carbonic oxide. A tube, G G' G'', passes across from the top of A and leads into a furnace, H, which is constructed like a reverberatory furnace, with a concave top and bottom. This furnace is all lined with highly-refractory material. Into this furnace a mixture of coal, zinc ore, and some ordinary flux—as lime—is introduced, in about the proportion of five of ore, one of coal, and a quantity of flux proportionate to the quantity of silica in the ore. This mixture of zinc ore, coal, and flux being introduced through L into H, and a constant supply of carbonic oxide being forced through G G' G'' into the furnace H, and a constant blast of hot air through K, the following action takes place in H: The carbonic oxide, with the hot-blast, burns, developing a large amount of heat, and elevates the temperature of the mass and causes the flux to unite with the silica and other earthy matter. At the same time all the zinc of the ore is deoxidized, and in consequence of the large excess of carbon and carbonic oxide present the oxide of zinc so formed is immediately afterward deoxidized or reduced, and the metallic-zinc vapors escape at M, and are condensed in the receiver or chamber N. Any white oxide of zinc which is not reduced passes on through O into a receptacle placed beyond for it. In order to secure the largest yield of metallic zinc, the air must not be introduced at K in excess, or white oxide will be mainly formed. A careful regulation of the supply of air must be had at K.

This furnace may therefore be used for the manufacture of white oxide of zinc in whole or in part, if so desired, and under many circumstances it might be advantageous so to use it.

The slag formed by the union of the flux and silica in H is drawn off at P through a small tap-hole.

By this apparatus a much larger yield of zinc can be obtained at much less expense, less fuel is required, and a less intense heat developed, thus preserving the apparatus from destruction. The silicate of zinc present in the ore yields up very nearly all its zinc, thereby increasing the yield in most ores which are worked for obtaining metallic zinc fifteen per cent. Moreover, certain ores which have not been heretofore worked at all for the manufacture of metallic zinc, on account of the large proportion of silica they contain, can be successfully and profitably worked in this apparatus.

Having thus described my improvement, what I claim as my invention, and desire to secure by Letters Patent, is—

The combination of the gas-generator and the reducing-furnace H, arranged and operating as above described.

ALFRED MONNIER.

Witnesses:
  GEO. HARDING,
  J. H. B. JENKINS.